United States Patent
Hernandez et al.

(10) Patent No.: US 12,523,390 B2
(45) Date of Patent: Jan. 13, 2026

(54) ADAPTIVE DUCT

(71) Applicant: GM GLOBAL TECHNOLOGY OPERATIONS LLC, Detroit, MI (US)

(72) Inventors: Rogelio Hernandez, Estado de Mexico (MX); Enrique Gomez Bravo, Toluca (MX); Carlos Ivan Delgado, Toluca (MX); Jorge Israel Barrera, Mexico City (MX); Alejandro Zaragoza, San Mateo Otzacatipan (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 515 days.

(21) Appl. No.: 18/088,058

(22) Filed: Dec. 23, 2022

(65) Prior Publication Data
US 2024/0210069 A1    Jun. 27, 2024

(51) Int. Cl.
*F24F 13/02* (2006.01)
*B60H 1/00* (2006.01)

(52) U.S. Cl.
CPC ..... *F24F 13/0218* (2013.01); *B60H 1/00564* (2013.01); *F24F 13/0209* (2013.01)

(58) Field of Classification Search
CPC .............. F24F 13/0218; F24F 13/0209; B60H 1/00564
See application file for complete search history.

(56) References Cited

U.S. PATENT DOCUMENTS

| | | | | |
|---|---|---|---|---|
| 474,563 | A * | 5/1892 | Moore | F16L 55/04 174/13 |
| 967,248 | A * | 8/1910 | Schepper et al. | F28F 3/04 138/28 |
| 1,061,418 | A * | 5/1913 | Stinsor | F16L 55/04 138/28 |
| 1,989,914 | A * | 2/1935 | Chase | 138/28 |
| 4,679,599 | A * | 7/1987 | Newberry | F16L 11/085 138/28 |
| 8,899,940 | B2 * | 12/2014 | Leugemors | F04B 11/00 138/28 |
| 10,842,052 | B2 * | 11/2020 | Gardner | H05K 7/20836 |
| 2001/0042538 | A1 * | 11/2001 | Rossi | F02M 69/465 123/456 |
| 2003/0226607 | A1 * | 12/2003 | Young | F16L 55/04 138/30 |
| 2004/0029522 | A1 * | 2/2004 | Gebke | F24F 13/0218 454/306 |

(Continued)

OTHER PUBLICATIONS

Anonymous "Adaptive Breathing Duct", Research Disclosure database No. 657029, Dec. 4, 2018, 2 pages.

*Primary Examiner* — David R Deal
(74) *Attorney, Agent, or Firm* — CANTOR COLBURN LLP

(57) ABSTRACT

Aspects of the disclosure include an adaptive duct for automotive applications. An exemplary adaptive duct can include an inlet connector configured to receive an incoming air flow volume, an outlet connector, and an adaptive body between the inlet connector and the outlet connector. The adaptive body can be coupled to an end of the inlet connector and to an end of the outlet connector. The adaptive body is made of a flexible material having a cross-sectional area that expands and contracts responsive to the incoming air flow volume.

17 Claims, 6 Drawing Sheets

(56) References Cited

U.S. PATENT DOCUMENTS

| | | | |
|---|---|---|---|
| 2010/0300541 A1* | 12/2010 | Carlay, II | F24F 13/0209 |
| | | | 137/1 |
| 2013/0011625 A1* | 1/2013 | Jevons | F01D 5/282 |
| | | | 428/221 |
| 2015/0064027 A1* | 3/2015 | Leugemors | F04B 11/00 |
| | | | 417/543 |
| 2019/0075876 A1* | 3/2019 | Burek | A42B 3/124 |
| 2019/0240607 A1* | 8/2019 | Yamada | B01D 46/71 |

* cited by examiner

1

ADAPTIVE DUCT

INTRODUCTION

The subject disclosure relates to air flow systems, and particularly to an adaptive duct in automotive applications.

A duct system is a collection of channels (e.g., tubes, pipes, hoses, conduits, etc.) that directs a fluid, typically air, from one location to another. Ducts can be located in vehicles, in a building's walls, floors, and ceilings, and in various industrial and infrastructure applications. For example, a vehicle's heating, ventilation, and air conditioning (HVAC) system relies upon a networks of ducts for air intake, air distribution to the passenger compartment, and air circulation. Vehicles also rely on ducts for engine and electrical system cooling.

Duct systems can be made from a variety of materials, such as flexible plastics, fiberglass, galvanized steel, aluminum, fiberboard, and combinations thereof, and can be made to accommodate a range of air flow requirements. Each type of duct has characteristics that are beneficial in specific applications, and improper material selection and duct sizing in a ductwork installation can result in inefficiency and increased costs.

SUMMARY

In one exemplary embodiment an adaptive duct can include an inlet connector configured to receive an incoming air flow volume, an outlet connector, and an adaptive body between the inlet connector and the outlet connector. The adaptive body can be coupled to an end of the inlet connector and to an end of the outlet connector. The adaptive body is made of a flexible material having a cross-sectional area that expands and contracts responsive to the incoming air flow volume.

In addition to one or more of the features described herein, in some embodiments, the inlet connector and the outlet connector each include a rigid material having a fixed cross-sectional area.

In some embodiments, when the inlet connector receives a first incoming air flow volume, the adaptive body maintains a first cross-sectional area, and wherein, when the inlet connector receives a second incoming air flow volume less than the first incoming air flow volume, the adaptive body maintains a second cross-sectional area less than the first cross-sectional area.

In some embodiments, a surface of the adaptive body includes one or more localized structural features sized and coordinated to force a minimum possible cross-sectional area in one or more regions of the adaptive body. In some embodiments, the minimum possible cross-sectional area occurs when the incoming air flow volume is zero.

In some embodiments, a surface of the adaptive body includes one or more collapsible features comprising a configuration of interlocking creases and folds.

In some embodiments, the adaptive body is made of one or more of polyethylene (PE), low density polyethylene (PEBD), linear low density polyethylene (PELBD), ethylene vinyl acetate copolymer (EVA), polyvinyl, waterproof felt, silicone fabric, and platinum-catalyzed silicon.

In another exemplary embodiment a vehicle includes an air flow system configured to receive an incoming air flow volume. The air flow system includes an adaptive duct. The adaptive duct can include an inlet connector, an outlet connector, and an adaptive body between the inlet connector and the outlet connector. The adaptive body can be coupled to an end of the inlet connector and to an end of the outlet connector. The adaptive body is made of a flexible material having a cross-sectional area that expands and contracts responsive to the incoming air flow volume.

In yet another exemplary embodiment a method includes coupling an adaptive duct to an air flow source. The adaptive duct includes an inlet connector configured to receive an incoming air flow volume from the air flow source, an outlet connector, and an adaptive body between the inlet connector and the outlet connector. The adaptive body is coupled to an end of the inlet connector and to an end of the outlet connector. The adaptive body is made of a material(s) having a cross-sectional area that expands and contracts responsive to the incoming air flow volume. The method includes providing a first incoming air flow volume from the air flow source to the inlet connector and dynamically adjusting the cross-sectional area of the adaptive body responsive to the first incoming air flow volume.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
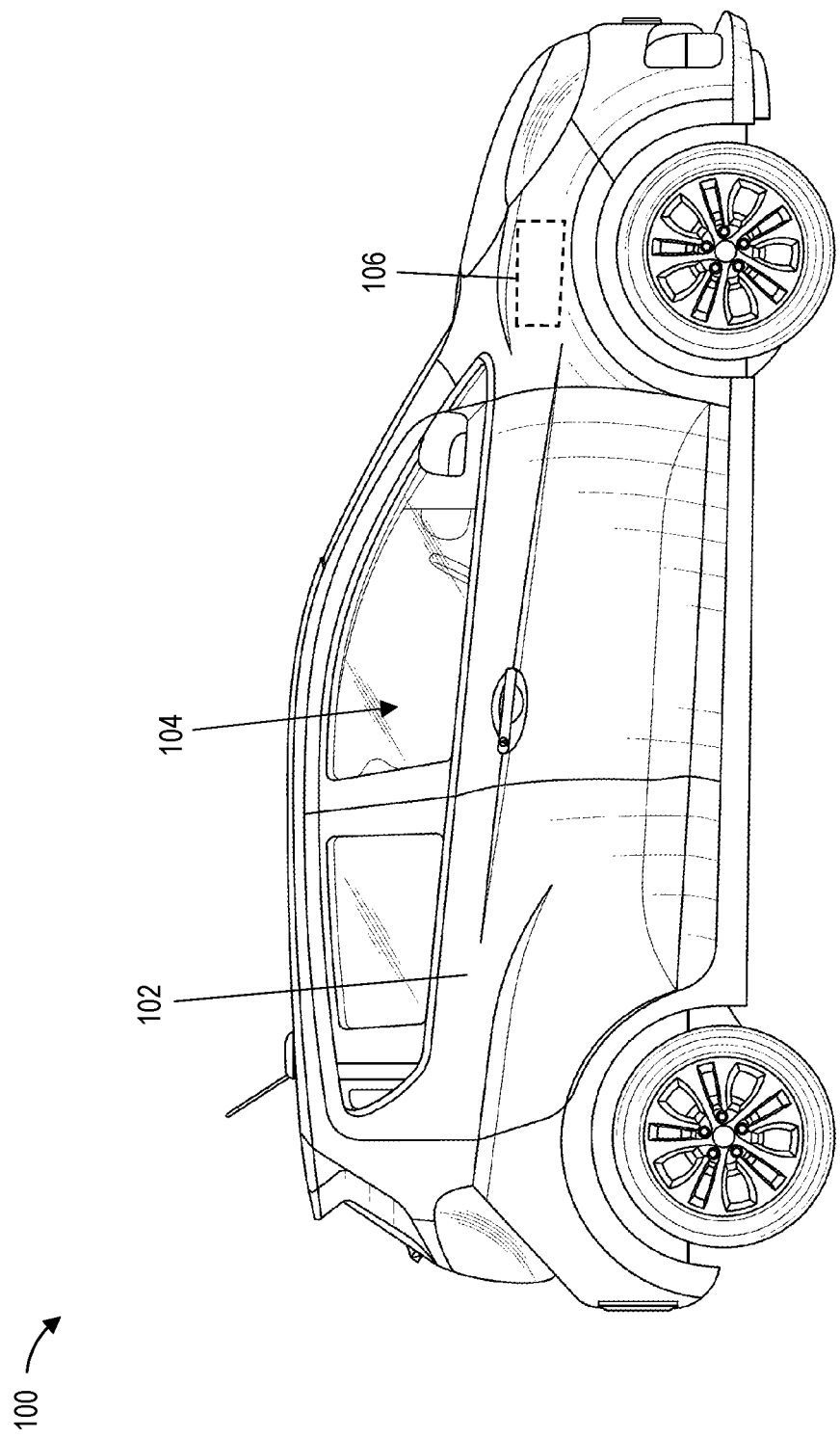
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an air flow system 106 (shown by projection under the front hood). The air flow system 106 is shown for ease of illustration and discussion only. It should be understood that the configuration, location, size, arrangement, etc., of the air flow system 106 is not meant to be particularly limited, and all such configurations (including configurations having multiple separate and/or coupled air flow systems) are within the contemplated scope of this disclosure. As will be detailed herein, the air flow system 106 includes an adaptive duct having a variable cross-sectional area.

As discussed previously, air flow systems (e.g., the air flow system 106) can service a range of applications, including, for example, automotive heating, ventilation, and air conditioning (HVAC) systems as well as engine and electrical system cooling. Air flow systems rely on a network of ducts to direct air flow from a source (e.g., ambient) to a destination (e.g., an electric motor in an electric vehicle). Ducts are typically made from plastics, fiberglass, galvanized steel, aluminum, fiberboard, and combinations thereof.

Ducts made from these materials are somewhat rigid, and must be correctly sized depending on the expected air flow characteristics of a given application. In particular, ducts are designed to a specific cross-sectional area to accommodate an expected air flow volume. Oversizing or undersizing a duct can result in a variety of problems ranging from inefficiencies to system damage. For example, oversized ducts can cause a cooling system (e.g., HVAC system) to work harder than designed, increasing the cooling system's energy usage. Undersized ducts can not carry the required volume of air and are prone to excessive noise and inadequate cooling.

This disclosure introduces an adaptive duct having a variable cross-sectional area. An adaptive duct constructed in accordance with one or more embodiments has the advantage of self-adapting to the airflow needs of any application. In some embodiments, the adaptive duct includes an adaptive body arranged between two terminals (end connectors). The terminals can be made of rigid materials to ensure a robust interface with upstream and downstream systems and to reduce or avoid leakage. The adaptive body itself is made from flexible (elastic) materials such as, for example, polyethylene (PE), low density polyethylene (PEBD), linear low density polyethylene (PELBD), ethylene vinyl acetate copolymer (EVA), polyvinyl, waterproof felts, silicone fabrics, platinum-catalyzed silicones, etc. As used herein, a "flexible" material is a material having the ability to flex (increase and/or decrease) in cross-sectional area by at least 10 percent in response to air flow conditions. By automatically adapting in cross-sectional area to dynamically accommodate an input air flow, the adaptive duct is able to reduce noise and pressure drop. Embodiments described herein have shown up to 30 percent less pressure drop and a 1.5 dBA noise reduction over rigid air flow systems, with further improvements available depending on material and duct sizing selection. Moreover, adaptive ducts described herein enable applications having movable subsystems not compatible with rigid ducts (e.g., a sliding console).

Air flow systems incorporating adaptive ducts constructed in accordance with one or more embodiments offer several technical advantages over prior air flow solutions. For example, adaptive ducts offer inherent advantages in process integration, including improved space efficiency (i.e., increased packing density by stacking adaptive ducts at minimum cross-sectional area) and a less restrictive design-to-manufacturing path (e.g., the "same" adaptive ducts can accommodate a range of air flow requirements). From a logistics and containerization point of view, adaptive ducts constructed in accordance with one or more embodiments reduce complexity, space, and weight as these ducts can be stacked (i.e., stackable containerization) at higher densities than rigid ducts. The adaptive component itself, in particular, can be densely stacked after manufacturing and through shipping until delivered to a final assembly point and combined with the rigid connectors. Embodiments described herein have shown up to a 50 percent reduction in storage and transport volumes. Similarly, embodiments described herein have shown a reduction in weight of up to 50 percent over rigid ducts.

From a manufacturability point of view, adaptive ducts constructed in accordance with one or more embodiments can avoid a variety of manufacturing restrictions inherent in traditional processes such as injection molding or blow molding. Moreover, manufacturing complexity can be natively reduced by avoiding (or mitigating) the need for extra tooling and extra parts for programs or product variants having small variations in cross-sectional area or duct sizing requirements, as a single adaptive duct design having some range of achievable cross-sectional area can accommodate a range of air flow requirements as well as a range of duct characteristics (e.g., size, length, width, etc.). For example, an adaptive duct can accommodate a 20 mm movement in a connector position without resizing and/or redesigning the ductwork.

In addition, adaptive ducts constructed in accordance with one or more embodiments can incorporate localized materials (e.g., air bubbles) selected for their thermal properties, stiffness properties, and/or expansion control. The resultant air flow system offers increased manufacturing consistency and thermal performance over rigid ducts having sprayed/injected thermal management materials.

Figure 2:
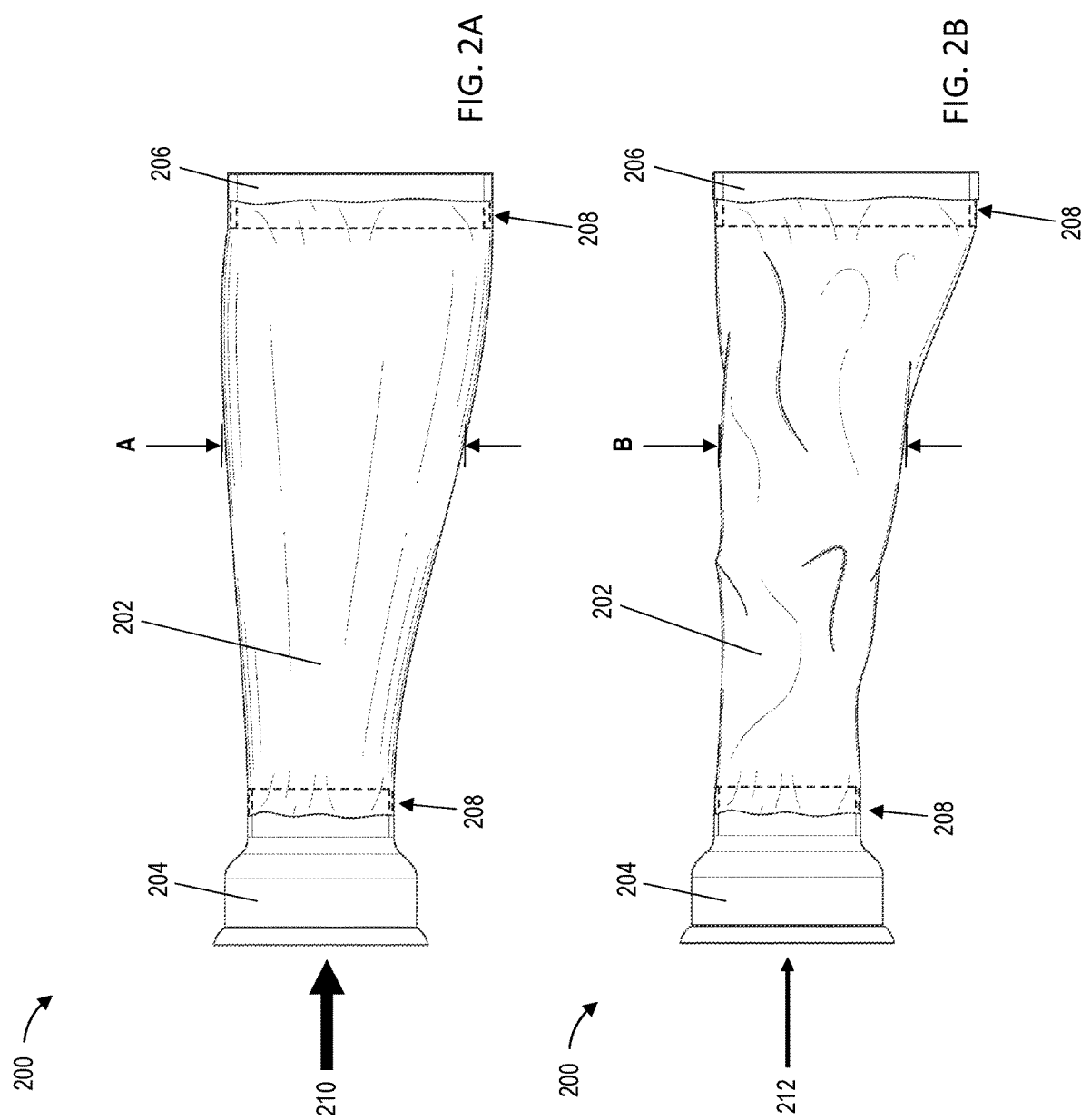
FIG. 2A is a view of an adaptive duct in accordance with one or more embodiments.
FIG. 2B is a view of the adaptive duct at a different air flow from that shown in FIG. 2A in accordance with one or more embodiments.

FIG. 2A illustrates a view of an adaptive duct 200 in accordance with one or more embodiments. FIG. 2B illustrates a view of the adaptive duct 200 at a different air flow from that shown in FIG. 2A in accordance with one or more embodiments. The adaptive duct 200 can be included, for example, in an air flow system of a vehicle (e.g., the air flow system 106 of FIG. 1). In some embodiments, the adaptive duct 200 includes an adaptive body 202 coupled between an inlet connector 204 and an outlet connector 206. While the adaptive body 202 is shown as having a single, continuous body for ease of illustration, other configurations are possible. For example, the adaptive duct 200 can include two or more adaptive bodies coupled in serial and/or parallel (refer to FIG. 5). Similarly, the adaptive body 202 is shown as having a single inlet (e.g., the inlet connector 204) and a single outlet (e.g., the outlet connector 206) for ease of illustration and discussion. Other configurations, including those having a plurality of inlet and/or outlets are possible, and all such configurations are within the contemplated scope of this disclosure.

The adaptive body 202 can be made from a range of suitable materials, depending on the material specifications for a given application. For example, the adaptive body 202 can include materials selected for flexibility while meeting specifications for temperature, durability, impermeability, flow, etc. Example materials include, but are not limited to, polyethylene (PE), low density polyethylene (PEBD), linear low density polyethylene (PELBD), ethylene vinyl acetate copolymer (EVA), polyvinyl, waterproof felts, silicone fabrics, and platinum-catalyzed silicones. The inlet connector 204 and the outlet connector 206 can be made of rigid materials, such as high-density polyethylene (HDPE), polycarbonates, and poly tetrafluoroethylene (PTFE), to ensure a robust interface with upstream and downstream systems (not separately shown).

The adaptive body 202, the inlet connector 204, and the outlet connector 206 can be made using a variety of processes depending on material selection. For example, the adaptive body 202 can be made from a combination of polymerization and injection molding. In some embodiments, the adaptive body 202 is made from two or more pieces that are bonded together through a secondary process such as welding. For example, the adaptive body 202 can include two halves welded together. The inlet connector 204 and the outlet connector 206 can be made using, for example, 3 dimensional (3D) printing and injection molding.

In some embodiments, each end 208 of the adaptive body 202 is fixed to one of the inlet connector 204 and the outlet connector 206. In some embodiments, the adaptive body 202 is fixed to the inlet connector 204 and the outlet connector 206 via adhesives, although other processes, including welding, tacking, melting, clamping, etc., are possible and within the contemplated scope of this disclosure. The inlet connector 204 and the outlet connector 206 serve to fix the interface (i.e., the shape, cross-sectional area, etc.) of the ends 208 of the adaptive body 202, ensuring a predictable shape and preventing collapse even for low or no air flow scenarios.

Advantageously, the terminals (e.g., the inlet connector 204 and the outlet connector 206) can be removed from the adaptive body 202 and replaced with new terminals having different characteristics (e.g., shape, size, materials, etc.). Terminal flexibility allows for a single adaptive body 202 design to accommodate a range of applications. In other words, an adaptive body can be coupled to a first set of terminals (e.g., the inlet connector 204 and the outlet connector 206) for a first application), while another adaptive body having the same characteristics can be coupled to a second set of terminals for a second application. Notably, the same adaptive body design can easily interface with a variety of upstream and/or downstream systems by changing the configuration of the terminals. Consequently, the adaptive body 202 can be reused and is interchangeable between different applications (e.g., automotive, home design, aeronautics, industry, etc.).

As shown in FIG. 2A, the adaptive body 202 includes a first maximal cross-sectional area "A" when subjected to a first air flow 210. As shown in FIG. 2B, the adaptive body 202 includes a second maximal cross-sectional area "B" when subjected to a second air flow 212. In some embodiments, the first air flow 210 is greater than the second air flow 212. Consequently, in some embodiments, the first maximal cross-sectional area "A" is greater than the second maximal cross-sectional area "B" due to the flexibility of the adaptive body 202.

Figure 3:
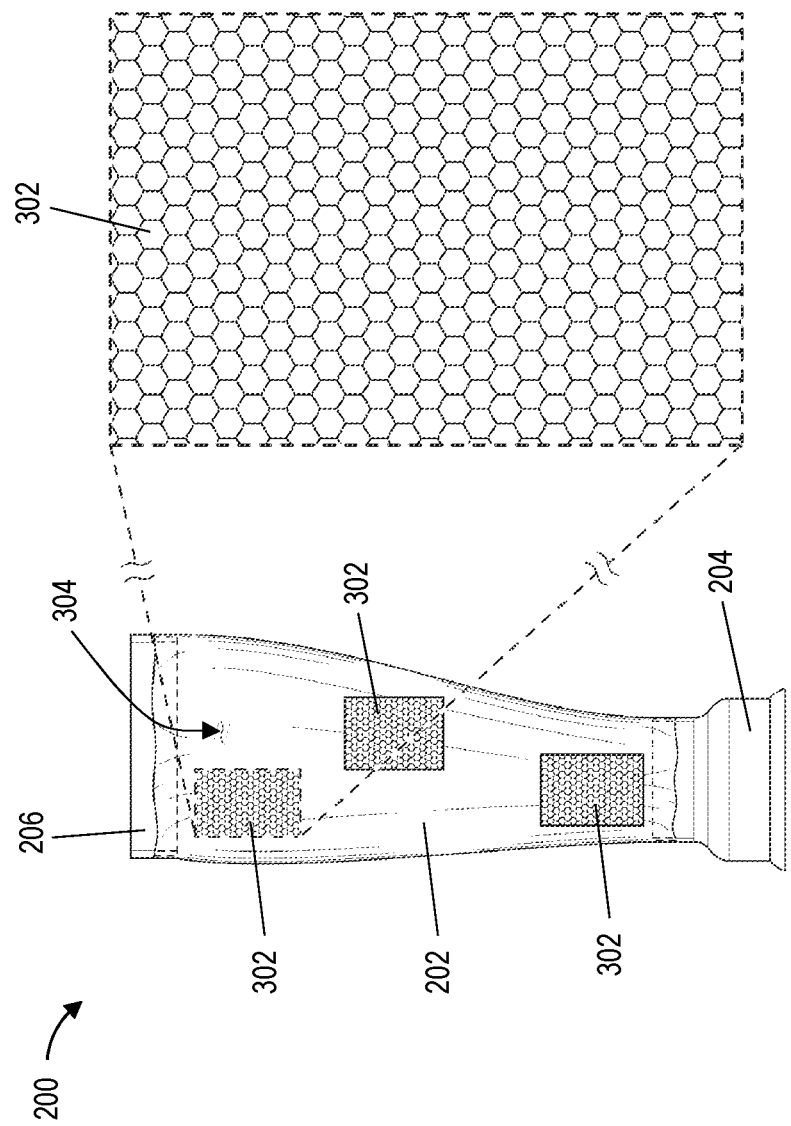
FIG. 3A is a view of an adaptive duct having localized structural features in accordance with one or more embodiments.
FIG. 3B is a detailed view of one of the localized structural features of FIG. 3A in accordance with one or more embodiments.

FIG. 3A illustrates a view of an adaptive duct 200 having localized structural features 302 in accordance with one or more embodiments. FIG. 3B illustrates a detailed view of one of the localized structural features 302 in accordance with one or more embodiments. As shown in FIG. 3A, in some embodiments, the adaptive duct 200 includes one or more localized structural features 302. The adaptive duct 200 is shown as having three similarly proportioned localized structural features 302 for ease of illustration and discussion. Other configurations, including those having a plurality of localized structural features 302 (having similar and/or dissimilar shapes, sizes, etc.) are possible, and all such configurations are within the contemplated scope of this disclosure.

In some embodiments, the adaptive body 202 is a hollowed component to maximize air flow from a source to an outlet. In some embodiments, the localized structural features 302 are incorporated within the surface 304 of the adaptive body 202. In this manner, the localized structural features 302 do not reduce the internal cross-sectional area of the adaptive body 202. In some embodiments, the localized structural features 302 are sized and coordinated to force a minimum possible cross-sectional area in one or more regions of the adaptive body 202, even for zero air flow conditions. In other words, the localized structural features 302 can prevent any collapse of the adaptive body 202 when the amount of air flow is low (or zero).

The localized structural features 302 can be made from a range of suitable materials. In some embodiments, the localized structural features 302 include silicon pattern reinforcements (as shown). The silicon pattern reinforcements can be arranged, for example, in a cross pattern, square pattern, honeycomb pattern, etc. FIG. 3B depicts the localized structural features 302 in an example honeycomb pattern. Other patterns and configurations are possible. For example, in some embodiments, the localized structural features 302 include a plurality of air bubbles (not separately shown). The air bubbles can be configured with a variety of different shapes and dimensions depending on the requirements of a particular duct design. In some embodiments, the localized structural features 302 are arranged and/or otherwise oriented along the surface 304 of the adaptive body 202 in a direction of air flow between the inlet connector 204 and the outlet connector 206.

Figure 4:
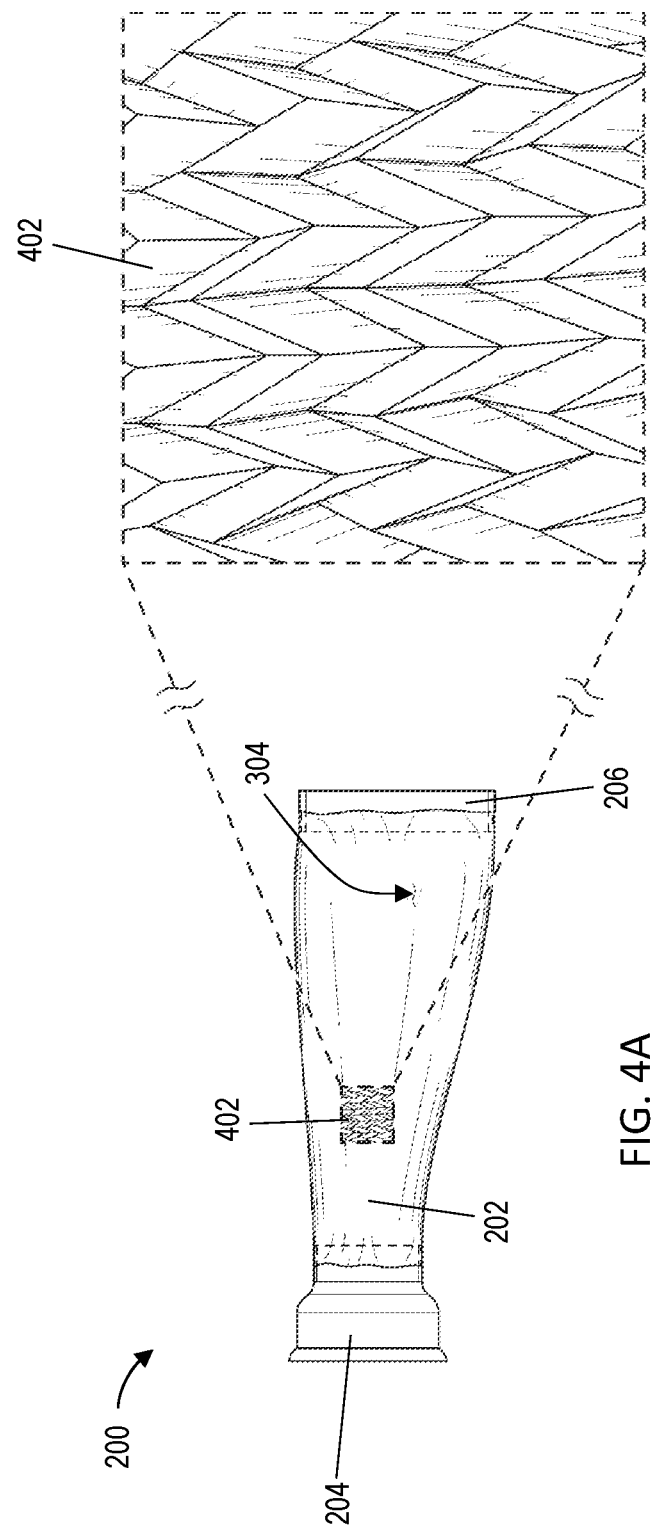
FIG. 4A is a view of an adaptive duct having collapsible features in accordance with one or more embodiments.
FIG. 4B is a detailed view of the collapsible features of FIG. 4A in accordance with one or more embodiments.

FIG. 4A illustrates a view of an adaptive duct 200 having collapsible features 402 in accordance with one or more embodiments. FIG. 4B illustrates a detailed view of the collapsible features 402 in accordance with one or more embodiments. As shown in FIG. 4A, in some embodiments, the surface 304 is wholly or partially covered by the collapsible features 402. The adaptive duct 200 is shown as having a single region of collapsible features 402 for ease of illustration and discussion. Other configurations, including embodiments where the entire surface of the adaptive body 202 is covered in collapsible features 402 are possible, and all such configurations are within the contemplated scope of this disclosure.

The collapsible features 402 can be made from a range of suitable materials. For example, the collapsible features 402 can be made of a same material as the adaptive body 202. In some embodiments, the collapsible features 402 are made, in whole or in part, in a natively foldable configuration of creases and folds. For example, the collapsible features 402 can include folded materials arranged according to the Yoshizawa-Randlett system (e.g., according to origami folding techniques). In some embodiments, the collapsible features 402 can be arranged in a herringbone tessellation pattern (as shown in FIG. 4B). Other configurations are possible, such as, for example, a series of Miura folds. In this manner, the collapsible features 402 contribute to the ability of the adaptive body 202 to natively contract and expand.

In some embodiments, the surface 304 of the adaptive body 202 includes a combination of the localized structural features 302 (refer to FIG. 3A) and the collapsible features 402 (refer to FIG. 4A). Any such combination is possible and all such configurations are within the contemplated scope of this disclosure.

Figure 5:
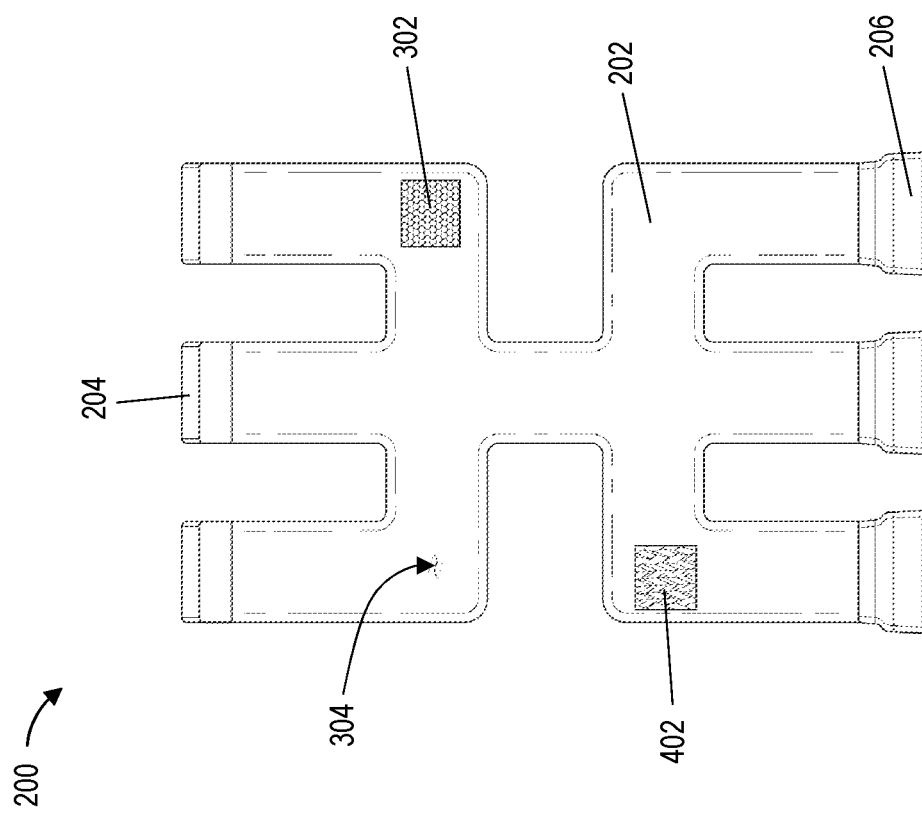
FIG. 5 is a view of an adaptive duct having multiple inlets and outlets in accordance with one or more embodiments.

FIG. 5 illustrates a perspective view of an adaptive duct 200 having multiple inlets and outlets in accordance with one or more embodiments. As shown in FIG. 5, in some embodiments, the adaptive duct 200 can include two or more inlets and/or two or more outlets. While the adaptive body 202 is shown as having three inlets (e.g., the three inlet connectors 204) and three outlets (e.g., the three outlet connectors 206) for ease of illustration, other configurations having arbitrary numbers of inlets and outlets are possible. Similarly, in some embodiments, the number of inlets need not match the number of outlets. All such configurations are within the contemplated scope of this disclosure.

As further shown in FIG. 5, in some embodiments, the adaptive duct 200 includes a combination of localized structural features 302 and/or collapsible features 402. The localized structural features 302 and/or collapsible features 402 can be arranged as desired on the surface 304 of the adaptive body 202. The number, configuration, size, and relative positions of the localized structural features 302 and/or collapsible features 402 is not meant to be particularly limited, and can be adjusted depending on the needs of a particular application.

Figure 6:
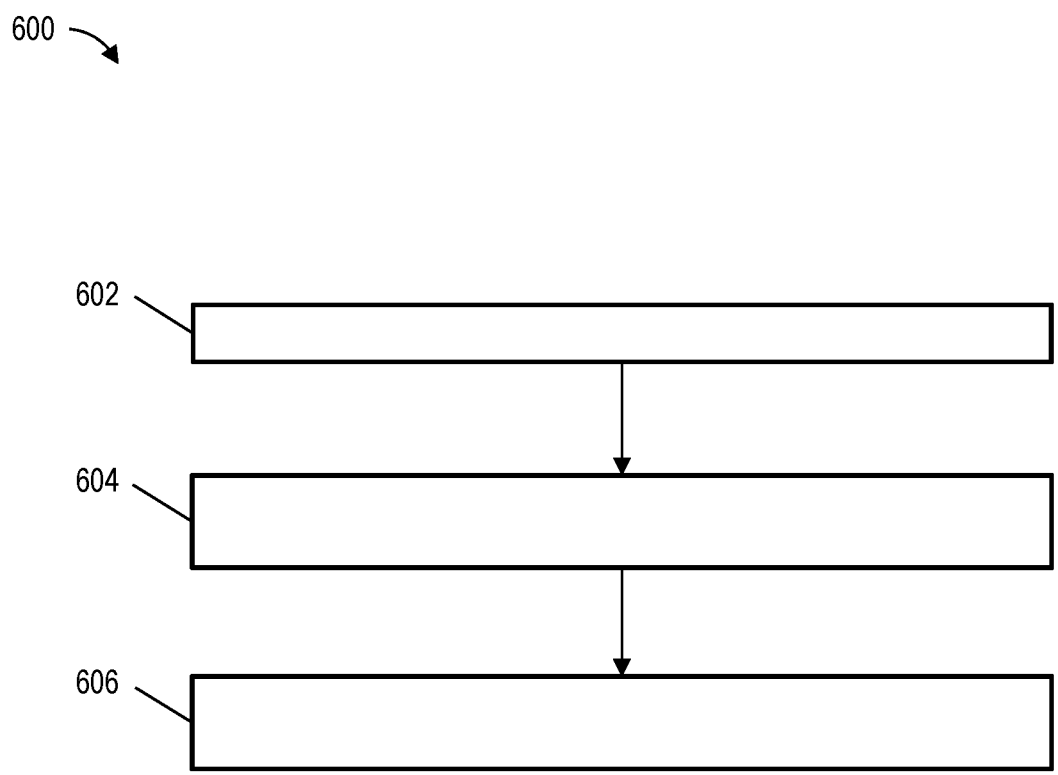
FIG. 6 is a flowchart in accordance with one or more embodiments.

Referring now to FIG. 6, a flowchart 600 for leveraging an adaptive duct for an air flow application is generally shown according to an embodiment. The flowchart 600 is described in reference to FIGS. 1 to 5 and may include additional steps not depicted in FIG. 6. Although depicted in a particular order, the blocks depicted in FIG. 6 can be rearranged, subdivided, and/or combined.

At block 602, an adaptive duct is coupled to an air flow source. In some embodiments, the adaptive duct includes an inlet connector configured to receive an incoming air flow volume from the air flow source, an outlet connector, and an adaptive body between the inlet connector and the outlet connector. The adaptive body can be coupled to an end of the inlet connector and to an end of the outlet connector. In some embodiments, the adaptive body includes a material(s) having a cross-sectional area that expands and contracts responsive to the incoming air flow volume.

In some embodiments, the inlet connector and the outlet connector each include a rigid material having a fixed cross-sectional area. In some embodiments, the adaptive body is made of a flexible material. In some embodiments, the adaptive body is made of one or more of PE, PEBD, PELBD, EVA, polyvinyl, waterproof felt, silicone fabric, and platinum-catalyzed silicon.

At block 604, a first incoming air flow volume is provided from the air flow source to the inlet connector. At block 606, the cross-sectional area of the adaptive body is dynamically adjusted responsive to the first incoming air flow volume. For example, when the air flow system receives a first incoming air flow volume, the adaptive body maintains a first cross-sectional area, and, when the air flow system receives a second incoming air flow volume less than the first incoming air flow volume, the adaptive body maintains a second cross-sectional area less than the first cross-sectional area.

In some embodiments, a surface of the adaptive body includes one or more localized structural features sized and coordinated to force a minimum possible cross-sectional area in one or more regions of the adaptive body. In some embodiments, the minimum possible cross-sectional area occurs when the first incoming air flow volume is zero.

In some embodiments, a surface of the adaptive body includes one or more collapsible features having a configuration of interlocking creases and folds.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An adaptive duct comprising:
   an inlet connector configured to receive an incoming air flow volume;
   an outlet connector; and
   an adaptive body between the inlet connector and the outlet connector, the adaptive body coupled to an end of the inlet connector and to an end of the outlet connector;
   wherein the adaptive body comprises a material having a cross-sectional area that expands and contracts responsive to the incoming air flow volume;
   wherein a surface of the adaptive body includes one or more collapsible features comprising a configuration of interlocking creases and folds, the collapsible features arranged in a herringbone tessellation pattern.

2. The adaptive duct of claim 1, wherein the inlet connector and the outlet connector each comprise a rigid material having a fixed cross-sectional area.

3. The adaptive duct of claim 1, wherein, when the inlet connector receives a first incoming air flow volume, the adaptive body comprises a first cross-sectional area, and wherein, when the inlet connector receives a second incoming air flow volume less than the first incoming air flow volume, the adaptive body comprises a second cross-sectional area less than the first cross-sectional area.

4. The adaptive duct of claim 1, wherein a surface of the adaptive body includes one or more localized structural features sized and coordinated to force a minimum possible cross-sectional area in one or more regions of the adaptive body.

5. The adaptive duct of claim 4, wherein the minimum possible cross-sectional area occurs when the incoming air flow volume is zero.

6. The adaptive duct of claim 1, wherein the adaptive body comprises one or more of polyethylene (PE), low density polyethylene (PEBD), linear low density polyethylene (PELBD), ethylene vinyl acetate copolymer (EVA), polyvinyl, waterproof felt, silicone fabric, and platinum-catalyzed silicon.

7. A vehicle comprising:
an air flow system configured to receive an incoming air flow volume, the air flow system comprising an adaptive duct, the adaptive duct comprising:
an inlet connector;
an outlet connector; and
an adaptive body between the inlet connector and the outlet connector, the adaptive body coupled to an end of the inlet connector and to an end of the outlet connector;
wherein the adaptive body comprises a material having a cross-sectional area that expands and contracts responsive to the incoming air flow volume;
wherein a surface of the adaptive body includes one or more collapsible features comprising a configuration of interlocking creases and folds, the collapsible features arranged in a herringbone tessellation pattern.

8. The vehicle of claim 7, wherein the inlet connector and the outlet connector each comprise a rigid material having a fixed cross-sectional area.

9. The vehicle of claim 7, wherein, when the air flow system receives a first incoming air flow volume, the adaptive body comprises a first cross-sectional area, and wherein, when the air flow system receives a second incoming air flow volume less than the first incoming air flow volume, the adaptive body comprises a second cross-sectional area less than the first cross-sectional area.

10. The vehicle of claim 7, wherein a surface of the adaptive body includes one or more localized structural features sized and coordinated to force a minimum possible cross-sectional area in one or more regions of the adaptive body.

11. The vehicle of claim 10, wherein the minimum possible cross-sectional area occurs when the incoming air flow volume is zero.

12. The vehicle of claim 7, wherein the adaptive body comprises one or more of polyethylene (PE), low density polyethylene (PEBD), linear low density polyethylene (PELBD), ethylene vinyl acetate copolymer (EVA), polyvinyl, waterproof felt, silicone fabric, and platinum-catalyzed silicon.

13. A method comprising:
coupling an adaptive duct to an air flow source, the adaptive duct comprising:
an inlet connector configured to receive an incoming air flow volume from the air flow source;
an outlet connector; and
an adaptive body between the inlet connector and the outlet connector, the adaptive body coupled to an end of the inlet connector and to an end of the outlet connector, wherein the adaptive body comprises a material having a cross-sectional area that expands and contracts responsive to the incoming air flow volume, wherein a surface of the adaptive body includes one or more collapsible features comprising a configuration of interlocking creases and folds, the collapsible features arranged in a herringbone tessellation pattern;
providing a first incoming air flow volume from the air flow source to the inlet connector; and
dynamically adjusting the cross-sectional area of the adaptive body responsive to the first incoming air flow volume.

14. The method of claim 13, wherein the inlet connector and the outlet connector each comprise a rigid material having a fixed cross-sectional area.

15. The method of claim 13, wherein a surface of the adaptive body includes one or more localized structural features sized and coordinated to force a minimum possible cross-sectional area in one or more regions of the adaptive body.

16. The method of claim 15, wherein the minimum possible cross-sectional area occurs when the first incoming air flow volume is zero.

17. The method of claim 13, wherein the adaptive body comprises one or more of polyethylene (PE), low density polyethylene (PEBD), linear low density polyethylene (PELBD), ethylene vinyl acetate copolymer (EVA), polyvinyl, waterproof felt, silicone fabric, and platinum-catalyzed silicon.

* * * * *